(12) United States Patent
Song et al.

(10) Patent No.: US 7,799,312 B2
(45) Date of Patent: Sep. 21, 2010

(54) METHOD FOR MANUFACTURING HIGH-DENSITY INDIUM TIN OXIDE TARGET, METHODS FOR PREPARING TIN OXIDE POWDER AND INDIUM OXIDE POWDER USED THEREFOR

(75) Inventors: Kyong-hwa Song, Yongin (KR); Sang-cheol Park, Seoul (KR); Jung-gyu Nam, Suwon (KR)

(73) Assignee: Samsung Corning Precision Glass Co., Ltd., Gumi (KR)

( * ) Notice: Subject to any disclaimer, the term of this patent is extended or adjusted under 35 U.S.C. 154(b) by 495 days.

(21) Appl. No.: 11/806,064

(22) Filed: May 29, 2007

(65) Prior Publication Data
US 2007/0295944 A1   Dec. 27, 2007

Related U.S. Application Data

(63) Continuation-in-part of application No. 10/320,408, filed on Dec. 17, 2002, now abandoned, and a continuation-in-part of application No. 10/320,406, filed on Dec. 17, 2002, now abandoned.

(30) Foreign Application Priority Data

Mar. 22, 2002 (KR) .................. 10-2002-0015609
Mar. 22, 2002 (KR) .................. 10-2002-0015610

(51) Int. Cl.
*C01G 19/00* (2006.01)
(52) U.S. Cl. ............... 423/594.9; 252/520.1; 264/614; 264/642; 264/681; 501/126; 501/134
(58) Field of Classification Search ........... 423/89, 423/594.9; 501/126, 134; 252/520.1; 264/614, 264/642, 681
See application file for complete search history.

(56) References Cited

U.S. PATENT DOCUMENTS

| 489,624 | A | 1/1893 | Bertou |
| 5,238,674 | A | 8/1993 | Vercoulen et al. |
| 5,246,623 | A | 9/1993 | Giersberg et al. |
| 5,401,701 | A | 3/1995 | Ogawa et al. |
| 5,866,493 | A | 2/1999 | Lee et al. |
| 5,980,815 | A | 11/1999 | Matsunaga et al. |
| 6,051,166 | A | 4/2000 | Fujiwara et al. |
| 6,096,285 | A | 8/2000 | Hayashi et al. |
| 6,099,982 | A | 8/2000 | Okabe et al. |
| 6,121,178 | A * | 9/2000 | Eshima et al. ............ 501/126 |
| 2002/0119093 | A1 | 8/2002 | Murayama et al. |
| 2003/0178751 | A1* | 9/2003 | Song et al. ............... 264/603 |
| 2003/0178752 | A1* | 9/2003 | Song et al. ............... 264/681 |

FOREIGN PATENT DOCUMENTS

| JP | 60-046924 | 3/1985 |
| JP | 61-205625 | 9/1986 |
| JP | 62-001573 | 1/1987 |
| JP | 04-074860 | 3/1992 |
| JP | 06-191846 | 7/1994 |
| JP | 09-125236 | 5/1997 |
| JP | 10-017324 | 1/1998 |
| JP | 10-072253 | 3/1998 |
| JP | 10-095615 | 4/1998 |
| JP | 10-182150 | 7/1998 |
| JP | 11-079745 | 3/1999 |
| JP | 11-322336 | 11/1999 |
| JP | 2000-144393 | * 5/2000 |
| JP | 2002-029744 | 1/2002 |

OTHER PUBLICATIONS

Translation of Japan 2000-144393, May 26, 2000.*
Grant & Hackh's Chemical Dictionary, p. 593 (1987).

* cited by examiner

*Primary Examiner*—Steven Bos
(74) *Attorney, Agent, or Firm*—Lee & Morse, P.C.

(57) ABSTRACT

A method for manufacturing an indium tin oxide (ITO) target and methods for preparing indium oxide powder ($In_2O_3$) and tin oxide powder ($SnO_2$). The method for manufacturing an ITO (indium tin oxide) target includes preparing an $In_2O_3$ powder having a surface area of about 10-18 $m^2/g$ and an average particle diameter of between about 40 to 80 nm; preparing a $SnO_2$ powder having a surface area of about 8-15 $m^2/g$ and an average particle diameter of about 60-100 nm; molding a mixture of the $In_2O_3$ powder and the $SnO_2$ powder; and sintering the mixture at atmospheric pressure under oxidation atmosphere. The ITO target is applicable for a high-quality, transparent electrode for a display, such as a liquid crystal display, electroluminescent display, or field emission display.

21 Claims, 3 Drawing Sheets

METHOD FOR MANUFACTURING HIGH-DENSITY INDIUM TIN OXIDE TARGET, METHODS FOR PREPARING TIN OXIDE POWDER AND INDIUM OXIDE POWDER USED THEREFOR

CROSS-REFERENCE TO RELATED APPLICATIONS

The present application is a continuation-in-part application of U.S. patent application Ser. No. 10/320,406, entitled, "INDIUM OXIDE POWDER, METHOD FOR PREPARING THE SAME, AND METHOD FOR MANUFACTURING HIGH-DENSITY INDIUM TIN OXIDE TARGET," and U.S. patent application Ser. No. 10/320,408, entitled, "TIN OXIDE POWDER, METHOD FOR PREPARING THE SAME, AND METHOD FOR MANUFACTURING HIGH-DENSITY INDIUM TIN OXIDE TARGET," both of which were filed on Dec. 17, 2002 now abandoned.

BACKGROUND OF THE INVENTION

1. Field of the Invention

The present invention relates to a method for manufacturing an indium tin oxide (ITO) target and methods for preparing indium oxide powder ($In_2O_3$) and tin oxide powder ($SnO_2$). More particularly, the present invention relates to a method for manufacturing a high-density ITO target which is used in vacuum deposition of a high-quality transparent electrode layer of a display such as a liquid crystal display (LCD), electroluminescent (EL) display, and field emission display (FED), and methods for preparing indium oxide powder and tin oxide powder used in the manufacture of the high-density ITO target.

2. Description of the Related Art

Due to their conductivity and transparency with respect to visible light, ITO films with the composition of $In_2O_3$ and $SnO_2$ in a ratio of about 9:1 have been widely used as a transparent electrode film for an LCD, EL, or FED. In general, such an ITO film is coated on an insulating substrate such as a glass substrate by sputtering an ITO target. The ITO target is manufactured by molding ITO powder into a predetermined shape, for example, a rectangular parallelepiped shape, followed by sintering at a high temperature. To form a high-quality ITO film on the substrate by sputtering, the ITO target needs to have a high sintering density. If a low-density ITO target is used to form an ITO film by sputtering, nodules are easily generated on the target surface, thereby lowering the quality and yield of the resulting ITO film.

For this reason, a high-density ITO target is required to form a high-quality, transparent ITO electrode. To form such a high-density ITO target, ITO particles should be of an appropriate primary particle diameter. In general, the ITO particle diameter is inversely proportional to the target's sintering density. Therefore, the particle diameter should be reduced to increase the sintering density of the target. A method that is currently available for forming a high-density target having an approximately theoretical density is to reduce the particle diameter to a nano-scale. To manufacture a high-density target, it is important to adjust the ITO particle diameter to be uniform, as well as to reduce the particle diameter, for the following reasons. If a primary particle diameter of the ITO particles is too small, it is difficult to grind the particles after hydroxide calcination even though the driving force for sintering increases sufficiently for higher sintering density due to an increased specific surface area. It is also difficult to obtain a large molded body due to stress caused from the generation of many fine pores between the particles during target molding. In contrast, if a primary particle diameter of the ITO particles is too large, the fluidity and molding properties of the powder are improved, whereas the driving force for particle sintering is too low, so that pores between the particles become greatly enlarged, thereby increasing the energy requirement for removing the pores. For these reasons, to manufacture a high-density ITO target, the particle diameter should be fine and within a narrow range, and it should be easy to grind secondary particles.

A vapor phase method known for fine powder synthesis has been attracting attention as a method for nano-sized powder synthesis, but is limited to small-scale production of specific powder due to the difficulty of large-scale production. In this method, after powder synthesis, the particle diameter is reduced by grinding. In other words, the particle diameter of secondary particles rather than primary particles, which agglomerate to form the secondary particles, is controlled.

A liquid phase method has been used as a general method of large-scale powder production. Among other liquid phase methods, a precipitation method has been especially widely used to prepare ITO powder by precipitating metallic ions in a solution using a precipitant. In the precipitation method, the powder's characteristics are dependent upon the solution concentration, the reaction pH, the reaction temperature, the type of precipitant, the rate of adding a precipitant, etc.

The inventors of the present invention have discovered that the concentrations of the indium solution and tin solution are an important factor affecting the characteristics of the $In_2O_3$ powder and $SnO_2$ powder prepared by precipitation. However, none of the methods of the prior art have limited the concentration of the indium solution and tin solution for precipitation. As a result, until now, it has been highly difficult to control the surface area and average particle diameter of the $In_2O_3$ powder and $SnO_2$ powder even when controlling the pHs of the indium solution and tin solution, the temperature of precipitation reaction, the type of precipitant, the rate of adding the precipitant, etc. Accordingly, until now, it has been difficult to manufacture a high-density ITO target using the $In_2O_3$ powder and $SnO_2$ powder prepared by those methods.

SUMMARY OF THE INVENTION

It is a feature of an embodiment of the present invention to provide a method for manufacturing a high-density indium tin oxide (ITO) target having a sintering density approximate to a theoretical level.

It is another feature of an embodiment of the present invention to provide methods for preparing indium oxide ($In_2O_3$) powder and tin oxide ($SnO_2$) powder, both of which can be used in the manufacture of the high-density ITO target.

In order to provide the above features, an embodiment of the present invention provides a method of preparing an ITO target, comprising:

preparing an $In_2O_3$ powder having a surface area of about 10-18 $m^2/g$ and an average particle diameter of between about 40 to 80 nm; preparing a $SnO_2$ powder having a surface area of about 8-15 $m^2/g$ and an average particle diameter of about 60-100 nm; molding a mixture of the $In_2O_3$ powder and the $SnO_2$ powder; and sintering the mixture at atmospheric pressure under oxidation atmosphere. The mixture includes about 80-95% by weight of the $In_2O_3$ powder and about 5-20% by weight of the $SnO_2$ powder. The ITO target has a sintering density of greater than 7.0 $g/cm^3$, more specifically a sintering density of about 7.0-7.15, approximate to a theoretical density level. The sintering temperature for the ITO target is from about 1,200° C. to about 1,600° C.

Another embodiment of the present invention provides a method for preparing $In_2O_3$ powder, comprising: adding an alkaline precipitant to an indium solution having an indium ion concentration of about 2-5 M at room temperature, wherein the alkaline precipitant is added to the indium solution at a rate of about 0.5 L/min - about 4 L/min, while adjusting a pH of the indium solution to about 6-8 to form a $In(OH)_3$ precipitate; and calcining the $In(OH)_3$ precipitate at a temperature of between about 600° C. to about 1,100° C. to produce the $In_2O_3$ powder. The $In_2O_3$ powder preparation method may further include dissolving metallic indium in acid to form the indium solution. The $In_2O_3$ powder preparation method may further include dissolving an indium-containing salt in water to form the indium solution. In the present $In_2O_3$ powder preparation method, the indium-containing salt may include InCl3 and/or $In(NO_3)_3$. In the present $In_2O_3$ powder preparation method, the alkaline precipitant may include NH4OH, $NH_3$ gas, NaOH, KOH, $NH_4HCO_3$, $(NH_4)_2CO_3$, and/or a mixture including at least two of the foregoing materials. The $In_2O_3$ powder preparation method may further include washing and drying the precipitate before calcining.

Another embodiment of the present invention provides a method for preparing $SnO_2$ powder, comprising: preparing a tin solution by dissolving metallic tin in an acid, the tin solution consisting essentially of tin ions, other ions produced from the dissociation of the acid, molecules of the acid, and water, wherein the tin ions are in a concentration of about 0.5-2 M; allowing a tin hydroxide precipitate to precipitate from the tin solution at room temperature and aging the precipitate in the tin solution for about 1-24 hours; separating the precipitate from the tin solution; and calcining the separated precipitate at a temperature of about 400-900° C. to obtain the $SnO_2$ powder. In the present $SnO_2$ powder preparation method, the acid may include nitric acid and/or sulfuric acid, preferably a concentrated nitric acid and/or a concentrated sulfuric acid. The structural formula of the precipitate is $Sn(OH)_2$ and/or $Sn(OH)_4$. The $SnO_2$ powder preparation method may further comprise washing and drying the separated precipitate before the calcining.

Another embodiment of the present invention provides another method for preparing $SnO_2$ powder, comprising: preparing a tin solution by dissolving a tin-containing salt in water, the tin solution consisting essentially of tin ions, other ions produced from the dissociation of the salt, and water, wherein the tin ions are in a concentration of about 0.5-2 M; precipitating a precipitate of tin hydroxide by adding an alkaline precipitant to the tin solution at room temperature at a rate of about 0.5-3 L/min and adjusting the pH to about 3-7, and separating the precipitate from the tin solution; and calcining the separated precipitate at a temperature of about 400-900° C. to obtain the $SnO_2$ powder. In the method for preparing the $SnO_2$ powder in this embodiment of the present invention, the tin-containing salt may include $SnF_4$, $SnCl_4$, $SnI_4$, $Sn(C_2H_3O_2)_2$, $SnCl_2$, $SnBr_2$, $SnI_2$, and/or a mixture including at least two of the foregoing materials. The alkaline precipitant may include $NH_4OH$, $NH_3$ gas, NaOH, KOH, $NH_4HCO_3$, $(NH_4)_2CO_3$, and/or a mixture including at least two of the foregoing materials. Preferably, the $NH_4OH$ is 28 wt % $NH_4OH$. The $SnO_2$ powder method may further comprise washing and drying the separated precipitate before calcining the precipitate, as in the method described above.

In another embodiment of the present invention, there is provided an ITO (indium tin oxide) target having a sintering density of greater than 7.0 g/cm³, more specifically a-sintering density of about 7.0-7.15, approximate to a theoretical density level. The ITO target is a resultant of sintering a mixture of an $In_2O_3$ powder having a surface area of about 10-18 m²/g and an average particle diameter of between about 40 to 80 nm and a $SnO_2$ powder having a surface area of about 8-15 m²/g and an average particle diameter of about 60-100 nm. The mixture may include about 80-95% by weight of the $In_2O_3$ powder and about 5-20% by weight of the $SnO_2$ powder.

With the ITO target provided according to the present invention, a high-quality transparent electrode for a display such as a liquid crystal display (LCD), electroluminescent display (EL), such as organic light emitting diode (OLED), or field emission display (FED), may be easily manufactured.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
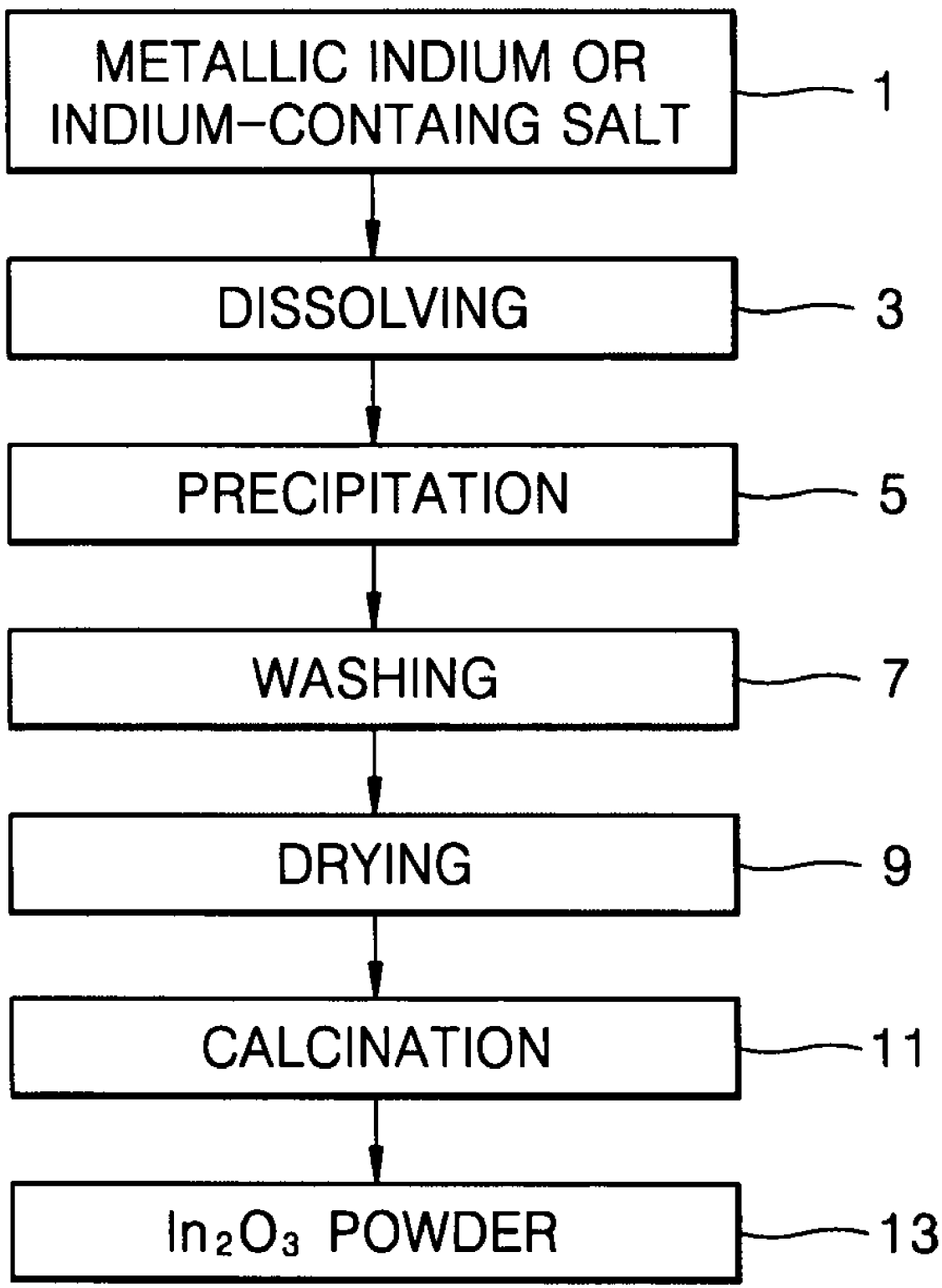
FIG. 1 depicts a flowchart for illustrating a method for preparing indium oxide ($In_2O_3$) powder according to an embodiment of the present invention.

Korean patent application No. 2002-15609, filed on Mar. 22, 2002, in the Korean Intellectual Property Office, and entitled: "TIN OXIDE POWDER, METHOD FOR PREPARING THE SAME, AND METHOD FOR MANUFACTURING HIGH-DENSITY INDIUM TIN OXIDE TARGET," and Korean patent application No. 2002-15610, filed on Mar. 22, 2002, in the Korean Intellectual Property Office, and entitled: "INDIUM OXIDE POWDER, METHOD FOR PREPARING THE SAME, AND METHOD FOR MANUFACTURING HIGH-DENSITY INDIUM TIN OXIDE TARGET," are incorporated by reference herein in their entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include a fourth member, whereas the expression "at least one selected from the group consisting of A, B, and C" does not.

A method for preparing the $In_2O_3$ powder, a method for preparing the $SnO_2$ powder, and a method for manufacturing an indium tin oxide (ITO) target using the $In_2O_3$ powder and the $SnO_2$ powder according to the present invention will now be described in detail.

The inventors of the present invention have discovered that fine, uniform, highly pure $In_2O_3$ powder suitable for a high-density ITO target may be prepared by systematically and accurately controlling the concentration of an indium solution as well as the temperature of precipitation reaction, the pH of the indium solution, the calcination temperature of $In_2O_3$ precipitate.

In preparing fine, uniform, highly pure $In_2O_3$ powder, the inventors of the present invention have discovered that the concentration of the indium solution is an important factor. According to the mechanism of particle formation by a precipitation method, precipitate nuclei are generated in a reaction solution with the addition of a precipitant. Precipitate nuclei collide and grow into primary particles. These primary particles generate nano-sized powder. In view of the precipitation mechanism, the solution concentration affects the number of precipitate nuclei during the precipitation and the probability of the nuclei colliding, and thus determines the size and shape of the particles. In particular, in a high-concentration reaction solution, precipitate nuclei are more likely to collide so that larger particles than those obtained by using a low-concentration reaction solution may be formed. Due to irregular collisions of particles, particles of a variety of shapes are precipitated. Spherical particles are favorable to increasing the density of a sintered ITO body. In this respect, the concentration of the indium solution is one of the most important factors in preparing $In_2O_3$ powder. When $In_2O_3$ powder is formed with the addition of a precipitant to an indium solution, particle shape and size are determined according to the initial concentration of indium. In one embodiment of the present invention, spherical $In_2O_3$ powder of a particular size and surface area, capable of being sintered into a high-density ITO target, is prepared by adjusting the initial concentration of indium ions in an indium solution.

The present invention also provides a method for manufacturing a high-density ITO target by limiting the average particle diameter of $SnO_2$ powder to provide a maximum sintering density when mixed with the $In_2O_3$ powder of a particular size and surface area prepared by the following method according to the present invention.

Hereinafter, a method for preparing $In_2O_3$ powder according to a preferred embodiment of the present invention will be described in detail with reference to FIG. 1.

FIG. 1 depicts a flowchart for illustrating an embodiment of a method for preparing $InO_3$ powder according to the present invention. Referring to FIG. 1, as a source material for the $In_2O_3$ powder, metallic indium or any suitable indium-containing salt, such as $InCl_3$, $In(NO_3)_3$, etc., may be used (Step 1). When metallic indium is used, an indium solution is obtained by dissolving the metallic indium in an acid such as a nitric acid. When an indium-containing salt is used, an indium solution is prepared by dissolving the indium-containing salt in distilled water (Step 3). The initial concentration of indium ions is controlled to about 2-5 M. If the concentration of indium ions is less than about 2 M, precipitation reaction time may be increased, and yield may be decreased. If the concentration of indium ions is greater than about 5 M, non-uniform particles may be produced because the precipitant may not be mixed smoothly due to thickening of the precipitate slurry during precipitation.

Next, an alkaline precipitant is added to the indium solution prepared as described above at room temperature to obtain $In(OH)_3$ precipitate (Step 5). Types of available alkaline precipitants are not limited. For example, $NH_4OH$, $NH_3$ gas, NaOH, KOH, $NH_4HCO_3$, $(NH_4)_2CO_3$, and/or a mixture including at least two of the foregoing materials may be used as the alkaline precipitant. Preferably, the alkaline precipitant is 28 wt % $NH_4OH$ (28% by weight of ammonia ($NH_3$) in water) in that it helps achieve $In_2O_3$ powder of a particular and uniform particles size and spherical shape, capable of being sintered into a high-density ITO target.

The rate of adding the precipitant is adjusted to about 0.5-4 L/min. If the rate of adding the precipitant is less than about 0.5 L/min, precipitation reaction time may be increased. If the rate of adding the precipitant is greater than about 4 L/min, the precipitant may not be mixed thoroughly, causing partial precipitation, thereby resulting in non-uniform precipitate particles. The pH of the indium solution is adjusted to about 6 to 8. If the pH of the indium solution is less than about 6, the precipitate particles may be very small. The pH of the indium solution greater than about 8 may have an adverse effect on the environment due to excess hydroxyl (OH) groups. In an implementation, the pH of the indium solution may be adjusted to an acidic pH, i.e., below pH 7, where pH 7 is neutral (not acidic or basic). For example, the pH of the indium solution may be adjusted to an acidic pH of about 6 or above and below pH 7. In an implementation, the addition of the alkaline precipitant may be carried out at room temperature. In the meaning of the present invention, the room temperature denotes the temperature range of less than 35° C., preferably, about 10° C.~30° C., and more preferably, about 15° C.~25° C., unless specified otherwise.

Subsequently, the precipitate is aged, separated using a centrifuge, and washed (Step 7). The washed precipitate is dried in an oven (Step 9), ground, and calcined in an electric furnace (Step 11) to obtain $In_2O_3$ powder. The calcination temperature is adjusted to between about 600 to 1100° C. If the calcination temperature is lower than about 600° C., the average particle diameter of the $In_2O_3$ powder may be too small. If the calcination temperature is higher than about 1100° C., the $In_2O_3$ powder may be sintered.

With the $In_2O_3$ powder preparation method according to the present invention as described above, $In_2O_3$ powder having a surface area of about 10-18 $m^2/g$ and an average particle diameter of between about 40 to 80 nm when measured by a BET method may be obtained. If a surface area of the $In_2O_3$ powder measured by the BET method is less than about 10 $m^2/g$ (corresponding to an average particle diameter of about 80 nm), the primary average particle diameter may be too large to provide enough driving force for a high sintering density. If a surface area of the $In_2O_3$ powder is larger than about 18 $m^2/g$ (corresponding to an average particle diameter of about 40 nm), the primary average particle diameter may be too fine to mold the $In_2O_3$ powder. Accordingly, it may be difficult to achieve and obtain both a high molding density and a high sintering density.

Hereinafter, a method for preparing the $SnO_2$ according to the present invention will be described in detail.

In preparing fine, uniform, highly pure $SnO_2$ powder, the tin ion concentration of the tin solution is considered to be an important factor for the following reason. According to the mechanism of particle formation by a precipitation method, precipitate nuclei are generated in a reaction solution with the addition of a precipitant. Precipitate nuclei collide and grow into primary particles. These primary particles generate nano-sized powder. In view of the precipitation mechanism, the solution concentration affects the number of precipitate nuclei during the precipitation and the probability of the nuclei colliding, and thus determines the size and shape of the particles. In particular, in a high-concentration reaction solution, precipitate nuclei are more likely to collide so that larger particles than those obtained by using a low-concentration reaction solution may be formed. Due to irregular collisions of particles, particles of a variety of shapes are precipitated. Spherical particles are favorable to increase the density of a sintered ITO body. In this respect, concentration is regarded as one of the most important factors in preparing $SnO_2$ powder. When $SnO_2$ powder is formed with the addition of a precipitant to a tin solution, particle shape and size are determined according to the initial concentration of tin. In one embodiment of the present invention, spherical $SnO_2$ particles of a particular size and surface area, capable of being sintered into a high-density ITO target, are prepared by adjusting the initial concentration of tin ions in a tin solution. Comparing with a conventional method in which $SnO_2$ synthesis is followed by particle size control using a jet mill, the method for preparing $SnO_2$ powder according to the present invention is advantageous in that the $SnO_2$ powder of a particular average particle diameter and surface area for a high-density ITO target may be directly and conveniently synthesized.

Figure 2:
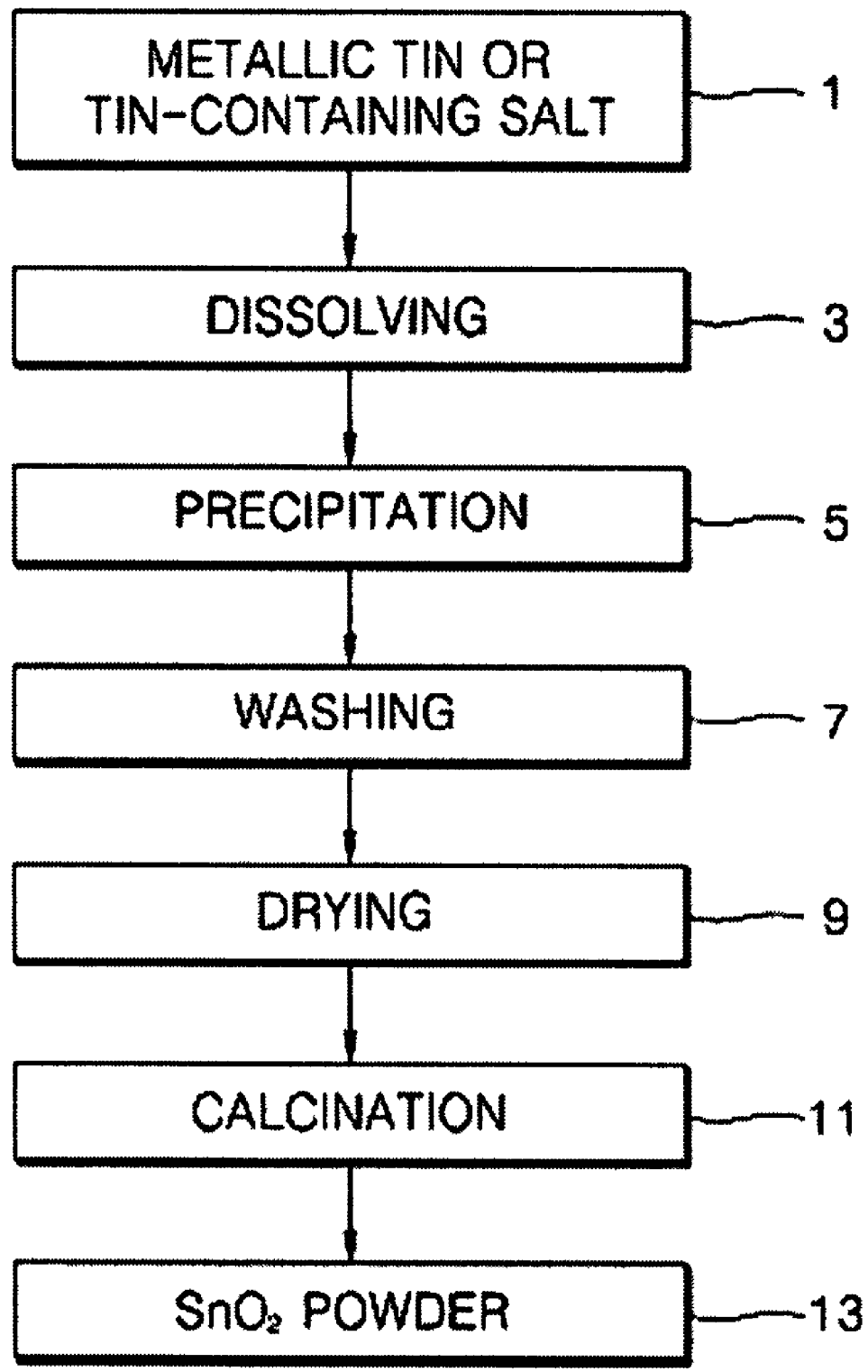
FIG. 2 depicts a flowchart for illustrating first and second embodiments of a method for preparing tin oxide ($SnO_2$) powder according to the present invention.
Figure 3:
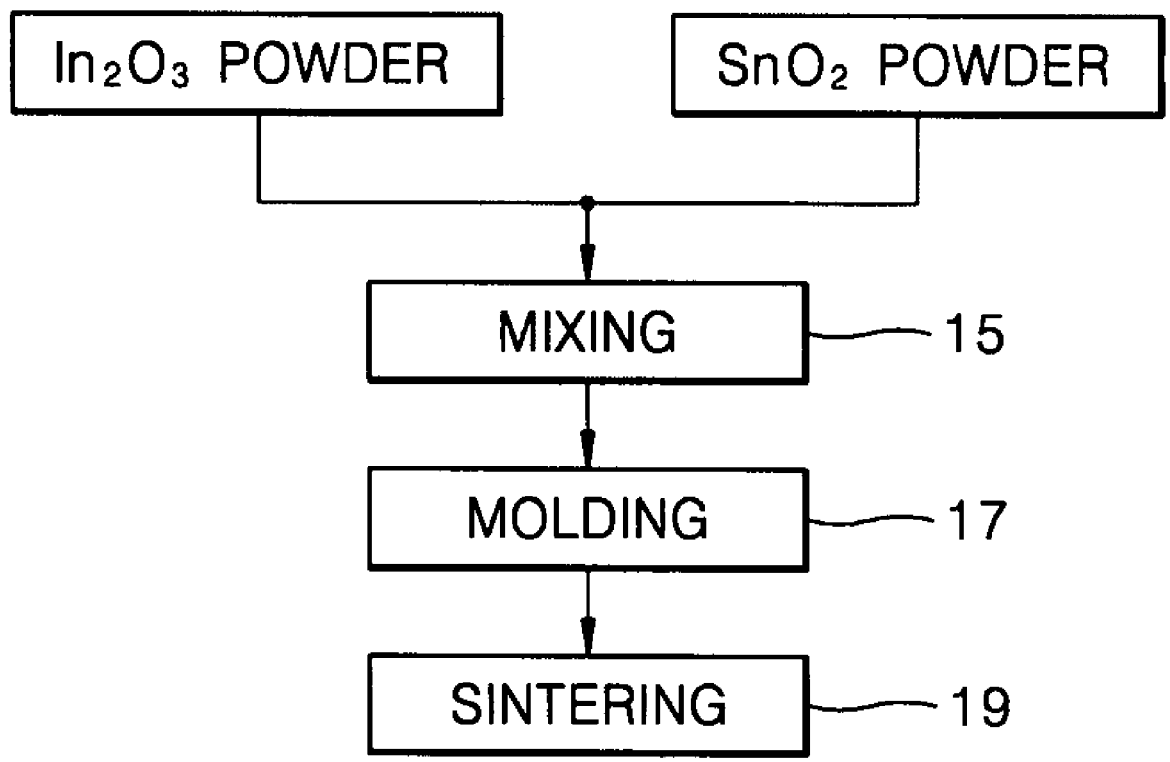
FIG. 3 depicts a flowchart for illustrating an embodiment of a method for manufacturing an indium tin oxide (ITO) target according to the present invention by mixing the $In_2O_3$ powder prepared by the method depicted in FIG. 1 with the $SnO_2$ powder prepared by the method depicted in FIG. 2.

FIG. 2 depicts a flowchart for illustrating first and second embodiments of a method for preparing $SnO_2$ powder according to the present invention. A first embodiment of the $SnO_2$ powder preparation method will be described first. Metallic tin is used as a source material (Step 1). Metallic tin is dissolved in an acid, such as a concentrated nitric acid and/or a concentrated sulfuric acid, to prepare a tin solution, from which a tin hydroxide precipitate, such as a $Sn(OH)_2$ and/or $Sn(OH)_4$, is obtained (Steps 3 and 5). The tin hydroxide precipitate is allowed to precipitate from the tin solution. $SnO_2$ powder of a desired size and surface area is obtained by adjusting the concentration of tin ions in the tin solution to about 0.5-2 M. If the concentration of the tin ions is less than about 0.5 M, precipitation reaction efficiency may be poor. If the concentration of the tin ions is greater than about 2 M, non-uniform particles may be produced due to thickening of the precipitate slurry during precipitation.

Next, the tin hydroxide precipitate is allowed to precipitate from the tin solution at room temperature and aged in the tin solution for about 1-24 hours, preferably for about 1-12 hours, separated by centrifugation, and washed (Step 7). Usually, it is sufficient for the ageing time to be in the range of about 1-4 hours. In fact, the inventors found that there is no problem in carrying out the preparation of the $SnO_2$ powder even when the ageing time is shortened to as short as about 1 hour. The washed precipitate is dried in an oven (Step 9), ground, and calcined in an electric furnace (Step 11) to obtain $SnO_2$ powder (Step 13). The calcination temperature is adjusted to about 400-900° C. If the calcination temperature is lower than about 400° C., the average particle diameter of the $SnO_2$ powder may be too small. If the calcination temperature is higher than about 900° C., the $SnO_2$ powder may be sintered.

Hereinafter, a second embodiment of the method for preparing $SnO_2$ powder according to the present invention will be described with reference to FIG. 2. A tin-containing salt, instead of metallic tin, is used as a source material (Step 1). Any suitable tin-containing salt soluble or decomposable in water, including $SnF_4$, $SnCl_4$, $SnI_4$, $Sn(C_2H_3O_2)_2$, $SnCl_2$, $SnBr_2$, $SnI_2$, and/or a mixture including at least two of the foregoing salts, may be used as a material for $SnO_2$ powder. In the second embodiment, an aqueous tin solution of the tin-containing salt in distilled water is used (Step 3). The initial concentration of tin ions is adjusted to about 0.5-2 M. Next, an alkaline precipitant is added to the aqueous tin solution at room temperature to obtain tin hydroxide precipitate (Step 5). The tin hydroxide precipitate may include, e.g., stannous hydroxide, $Sn(OH)_2$, and/or stannic hydroxide, $Sn(OH)_4$. The pH of the aqueous tin solution is adjusted to about 3-7 for the tin hydroxide precipitate. If the pH of the aqueous tin solution is less than 3, the precipitate particles may be very small. If the pH of the aqueous tin solution is greater than 7, an adverse effect on the environment due to excess hydroxyl (OH) groups may occur. The tin hydroxide precipitate is allowed to precipitate from the tin solution. As described above, no precipitant is necessary to obtain the precipitate in the first embodiment of the $SnO_2$ preparation method, whereas an alkaline precipitant is used to obtain the precipitate in the second embodiment. Types of available alkaline precipitants are not limited. For example, $NH_4OH$, $NH_3$ gas, $NaOH$, $KOH$, $NH_4HCO_3$, $(NH_4)_2CO_3$, and/or a mixture including at least two of these salts may be used as the alkaline precipitant. Preferably, the alkaline precipitant is 28 wt % $NH_4OH$ in that it helps achieve $SnO_2$ powder of a particular and uniform particles size and spherical shape, capable of being sintered into a high-density ITO target. The rate of adding the precipitant is adjusted to about 0.5-3 L/min. If the rate of adding the precipitant is less than about 0.5 L/min, precipitation reaction time may be increased. If the rate of adding the precipitant is greater than about 3 L/min, the precipitant may not be mixed thoroughly, causing partial precipitation, thereby resulting in non-uniform precipitate particles. The following processes, including aging, separation, washing (Step 7), drying (Step 9), and calcination (Step 11) of the precipitant, to obtain the $SnO_2$ powder (Step 13), are the same as those performed in the first embodiment described above.

With the $SnO_2$ powder preparation method according to the first or second embodiment of the present invention, it is possible to conveniently prepare $SnO_2$ powder having a surface area of about 8-15 $m_2$/g and an average particle diameter of about 60-100 nm when measured by a BET method. If a surface area of the $SnO_2$ powder measured by the BET method is less than about 8 $m^2$/g (corresponding to an average particle diameter of 100 nm), the primary average particle diameter may be too large to provide enough driving force for a high sintering density. If a surface area of the $SnO_2$ powder is larger than about 15 $m^2$/g (corresponding to an average particle diameter of 60 nm), the primary average particle diameter may be too fine to mold the $SnO_2$ powder. Accordingly, it may be difficult to achieve and obtain both a high molding density and high sintering density.

Hereinafter, a method for manufacturing a high-density ITO target using the $In_2O_3$ powder prepared as described above by the method according to the present invention, which has a surface area of about 10-18 $m^2$/g and an average particle diameter of between about 40 to 80 nm when measured by the BET method; and the $SnO_2$ powder prepared as described above by the method according to the present invention, which has a surface area of about 8-15 $m^2$/g and an average particle diameter of about 60-100 nm when measured by the BET method, will be described.

FIG. 2 depicts a flowchart for illustrating a method for preparing a high-density ITO target by mixing the $In_2O_3$ powder with the $SnO_2$ powder prepared by the methods according to the present invention. Referring to FIG. 2, about 80-95% by weight of the $In_2O_3$ powder prepared according to the present invention and about 5-20% by weight of $SnO_2$ powder prepared according to the present invention are mixed. The $In_2O_3$ powder has a surface area of about 5-18

$m^2/g$, preferably 10-18 $m^2/g$, when measured by the BET method. The $SnO_2$ powder has a surface area of between about 4 to 15 $m^2/g$, preferably between about 8 to 15 $m^2/g$, when measured by the BET method. The $In_2O_3$ and the $SnO_2$ are mixed by, for example, ball milling (Step 15). The resulting powder mixture is dried and molded into a rectangular parallelepiped target (Step 17). The molded product is thermally treated for sintering at between about 1,200 to 1,600° C. in a sintering furnace at atmospheric pressure under oxidation atmosphere to obtain an ITO target (Step 19). The characteristics of the final ITO target are evaluated by measuring, for example, the sintering density. If the sintering temperature is lower than about 1,200° C., it may be difficult to completely solidify the two oxides during the sintering, and the energy may be insufficient for a high sintering density. If the sintering temperature is above about 1,600° C., which is high enough for phase change and sintering of the oxides, the yield of the ITO target may decrease with increasing sintering duration because $In_2O_3$ and $Sn_2$ are volatile at high temperatures.

As described above, the method of forming a high-density ITO target according to the present invention may provide sintered ITO bodies with densities of about 7.0 to about 7.15 $g/cm^3$, e.g., 7.08 to 7.14 $g/cm^3$, which may be considerably higher than the densities of the sintered ITO bodies produced using conventional methods. Moreover, it is surprising that such a high-density ITO target can be obtained through a sintering process operating at atmospheric pressure.

The methods for preparing $In_2O_3$ powder and $SnO_2$ powder, and the method for manufacturing an ITO target according to the present invention will be described in greater detail with reference to the following examples.

The following examples are for illustrative purposes and are not intended to limit the scope of the invention.

Synthesis of $SnO_2$ Powder

A method for synthesizing $SnO_2$ powder to be mixed with $In_2O_3$ powder and sintered to form ITO targets in the following examples 1 through 6 and comparative examples 1-7 is described herein. $SnCl_4$ was dissolved in 5 L of water to obtain a tin ion solution containing tin ions in a concentration of 1.0 M. 28 wt % $NH_4OH$ precipitant was added to the solution at a rate of 1 L/min to obtain tin hydroxide precipitate. The tin hydroxide precipitate was aged for 9-12 hours, separated using a centrifuge, and washed with distilled water. The washed precipitate was dried at 100° C. in an oven, and the dried powder was ground. The ground powder was calcined in an electric furnace at 700° C. for 2 hours. The resulting $SnO_2$ powder had a surface area of 10 $m^2/g$ when measured by the BET method.

EXAMPLE 1

A predetermined amount of $In(NO_3)_3$, equivalent to a final indium ion concentration of 2.5 M, was dissolved in 5 L of distilled water. A precipitate was obtained by adding 28 wt % $NH_4OH$ as a precipitant to the solution at a rate of 2 L/min at room temperature. The pH of the solution was adjusted to 8. The resulting precipitate was aged for 9-12 hours, separated using a centrifuge, and washed. The washed precipitate was dried at 100° C. in an oven, and the dried powder was ground by ball milling. The ground powder was calcined in an electric furnace at 700° C. for 2 hours. The resulting $In_2O_3$ powder had a surface area of 18 $m^2/g$ when measured by the BET method.

The $In_2O_3$ powder prepared as described above and $SnO_2$ powder having a surface area of 10 $m^2/g$ when measured by the BET method were mixed in a weight ratio of 90:10. The powder mixture was molded into a predetermined shape using a mold and sintered at atmospheric pressure under oxidation atmosphere. The resulting ITO target of a 20-cm width, 15-cm length, and 1-cm height had a sintering density of 7.13 $g/cm^3$.

EXAMPLE 2

In Example 2, 1436 g of metallic indium was completely dissolved in 5 L 60 wt %-nitric acid to obtain a 2.5 M $In(NO_3)_3$ solution. A precipitate was obtained by adding 28 wt % $NH_4OH$ as a precipitant to the solution at a rate of 2 L/min at room temperature. The pH of the solution was adjusted to 8. The resulting precipitate was aged for 9-12 hours, separated using a centrifuge, and washed. The washed precipitate was dried at 100° C. in an oven, and the dried powder was ground by ball milling. The ground powder was calcined in an electric furnace at 800° C. for 2 hours. The resulting $In_2O_3$ powder had a surface area of 17 $m^2/g$ when measured by the BET method.

The $In_2O_3$ powder prepared as described above and $SnO_2$ powder having a surface area of 10 $m^2/g$ when measured by the BET method were mixed in a weight ratio of 90:10. The powder mixture was molded into a predetermined shape and sintered at atmospheric pressure under oxidation atmosphere. The resulting ITO target of a 20-cm width, 15-cm length, and 1-cm height had a sintering density of 7.14 $g/cm^3$.

EXAMPLE 3

A predetermined amount of $In(NO_3)_3$, equivalent to a final indium ion concentration of 2.5 M, was dissolved in 5 L of distilled water. A precipitate was obtained by adding 28 wt % $NH_4OH$ as a precipitant to the solution at a rate of 0.5 L/min at room temperature. The pH of the solution was adjusted to 8. The resulting precipitate was aged for 9-12 hours, separated using a centrifuge, and washed. The washed precipitate was dried at 100° C. in an oven, and the dried powder was ground by ball milling. The ground powder was calcined in an electric furnace at 800° C. for 2 hours. The resulting $In_2O_3$ powder had a surface area of 16 $m^2/g$ when measured by the BET method.

The $In_2O_3$ powder prepared as described above and $SnO_2$ powder having a surface area of 10 $m^2/g$ when measured by the BET method were mixed in a weight ratio of 90:10. The powder mixture was molded into a predetermined shape using a mold and sintered at atmospheric pressure under oxidation atmosphere. The resulting ITO target of a 20-cm width, 15-cm length, and 1-cm height had a sintering density of 7.08 $g/cm^3$.

EXAMPLE 4

A predetermined amount of $In(NO_3)_3$ was dissolved in 5 L of distilled water to obtain an indium solution having an indium ion concentration of 3.0 M. A precipitate was obtained by adding 28 wt % $NH_4OH$ as a precipitant to the solution at a rate of 2 L/min at room temperature. The pH of the solution was adjusted to 7. The resulting precipitate was stirred, aged for 9-12 hours, separated using a centrifuge, and washed. The washed precipitate was dried at 100° C. in an oven, and the dried powder was ground by ball milling. The ground powder was calcined in an electric furnace at 800° C. for 2 hours. The resulting $In_2O_3$ powder had a surface area of 14 $m^2/g$ when measured by the BET method.

The $In_2O_3$ powder prepared as described above and $SnO_2$ powder having a surface area of 10 $m^2/g$ when measured by the BET method were mixed in a weight ratio of 90:10. The powder mixture was molded into a predetermined shape using a mold and sintered at atmospheric pressure under oxidation atmosphere. The resulting ITO target of a 20-cm width, 15-cm length, and 1-cm height had a sintering density of 7.10 g/cm$^3$.

EXAMPLE 5

A predetermined amount of $In(NO_3)_3$ was dissolved in distilled water to obtain an indium solution having an indium ion concentration of 2.5 M was dissolved in 5 L of distilled water. A precipitate was obtained by adding 28 wt % $NH_4OH$ as a precipitant to the solution at a rate of 2 L/min at room temperature. The pH of the solution was adjusted to 7. The resulting precipitate was stirred, aged for 9-12 hours, separated using a centrifuge, and washed. The washed precipitate was dried at 100° C. in an oven, and the dried powder was ground by ball milling. The ground powder was calcined in an electric furnace at 850° C. for 2 hours. The resulting $In_2O_3$ powder had a surface area of 11 m$^2$/g when measured by the BET method.

The $In_2O_3$ powder prepared as described above and $SnO_2$ powder having a surface area of 10 m$^2$/g when measured by the BET method were mixed in a weight ratio of 90:10. The powder mixture was molded into a predetermined shape using a mold and sintered at atmospheric pressure under oxidation atmosphere. The resulting ITO target of a 20-cm width, 15-cm length, and 1-cm height had a sintering density of 7.13 g/cm$^3$.

EXAMPLE 6

A predetermined amount of $In(NO_3)_3$ was dissolved in 5 L of distilled water to obtain an indium solution having an indium ion concentration of 2.5 M. A precipitate was obtained by adding 28 wt % $NH_4OH$ as a precipitant to the solution at a rate of 1 L/min at room temperature. The pH of the solution was adjusted to 7. The resulting precipitate was stirred, aged for 9-12 hours, separated using a centrifuge, and washed. The washed precipitate was dried at 100° C. in an oven, and the dried powder was ground by ball milling. The ground powder was calcined in an electric furnace at 850° C. for 2 hours. The resulting $In_2O_3$ powder had a surface area of 12 m$^2$/g when measured by the BET method.

The $In_2O_3$ powder prepared as described above and $SnO_2$ powder having a surface area of 10 m$^2$/g when measured by the BET method were mixed in a weight ratio of 90:10. The powder mixture was molded into a predetermined shape using a mold and sintered at atmospheric pressure under oxidation atmosphere. The resulting ITO target of a 20-cm width, 15-cm length, and 1-cm height had a sintering density of 7.12 g/cm$^3$.

COMPARATIVE EXAMPLE 1

A predetermined amount of $In(NO_3)_3$ was dissolved in 5 L of distilled water to obtain an indium solution having an indium ion concentration of 1 M.

A precipitate was obtained by adding 28 wt % $NH_4OH$ as a precipitant to the solution at a rate of 2 L/min at room temperature. The pH of the solution was adjusted to 8. The resulting precipitate was stirred, aged for 9-12 hours, separated using a centrifuge, and washed. The washed precipitate was dried at 100° C. in an oven, and the dried powder was ground by ball milling. The ground powder was calcined in an electric furnace at 700° C. for 2 hours. The resulting $In_2O_3$ powder had a surface area of 25 m$^2$/g when measured by the BET method.

The $In_2O_3$ powder prepared as described above and $SnO_2$ powder having a surface area of 10 m$^2$/g when measured by the BET method were mixed in a weight ratio of 90:10. The powder mixture was molded into a predetermined shape using a mold and sintered at atmospheric pressure under oxidation atmosphere. The resulting ITO target had a sintering density of 6.91 g/cm$^3$.

COMPARATIVE EXAMPLE 2

A predetermined amount of $In(NO_3)_3$ was dissolved in 5 L of distilled water to obtain an indium solution having an indium ion concentration of 2.5 M. A precipitate was obtained by adding 28 wt % $NH_4OH$ as a precipitant to the solution at a rate of 0.05 L/min at room temperature to obtain a precipitate. The pH of the solution was adjusted to 8. The resulting precipitate was stirred, aged for 9-12 hours, separated using a centrifuge, and washed. The washed precipitate was dried at 100° C. in an oven, and the dried powder was ground by ball milling. The ground powder was calcined in an electric furnace at 700° C. for 2 hours. The resulting $In_2O_3$ powder had a surface area of 30 m$^2$/g when measured by the BET method.

The $In_2O_3$ powder prepared as described above and $SnO_2$ powder having a surface area of 10 m$^2$/g when measured by the BET method were mixed in a weight ratio of 90:10. The powder mixture was molded into a predetermined shape using a mold and sintered at atmospheric pressure under oxidation atmosphere. The resulting ITO target had a sintering density of 6.30 g/cm$^3$.

COMPARATIVE EXAMPLE 3

A predetermined amount of $In(NO_3)_3$ was dissolved in 5 L of distilled water to obtain an indium solution having an indium ion concentration of 2.5 M. A precipitate was obtained by adding 28 wt % $NH_4OH$ as a precipitant to the solution at a rate of 2 L/min at room temperature. The pH of the solution was adjusted to 4. The resulting precipitate was stirred, aged for 9-12 hours, separated using a centrifuge, and washed. The washed precipitate was dried at 100° C. in an oven, and the dried powder was ground by ball milling. The ground powder was calcined in an electric furnace at 700° C. for 2 hours. The resulting $In_2O_3$ powder had a surface area of 23 m$^2$/g when measured by the BET method.

The $In_2O_3$ powder prepared as described above and $SnO_2$ powder having a surface area of 10 m$^2$/g when measured by the BET method were mixed in a weight ratio of 90:10. The powder mixture was molded into a predetermined shape using a mold and sintered at atmospheric pressure under oxidation atmosphere. The resulting ITO target had a sintering density of 6.60 g/cm$^3$.

COMPARATIVE EXAMPLE 4

A predetermined amount of $In(NO_3)_3$ was dissolved in 5 L of distilled water to obtain an indium solution having an indium ion concentration of 2.5 M. A precipitate was obtained by adding 28 wt % $NH_4OH$ as a precipitant to the solution at a rate of 2 L/min at room temperature to obtain a precipitate. The pH of the solution was adjusted to 8. The resulting precipitate was stirred, aged for 9-12 hours, separated using a centrifuge, and washed. The washed precipitate was dried at 100° C. in an oven, and the dried powder was ground by ball milling. The ground powder was calcined in an electric furnace at 500° C. for 2-hours. The resulting $In_2O_3$ powder had a surface area of 32 $m^2/g$ when measured by the BET method.

The $In_2O_3$ powder prepared as described above and $SnO_2$ powder having a surface area of 10 $m^2/g$ when measured by the BET method were mixed in a weight ratio of 90:10. The powder mixture was molded into a predetermined shape using a mold and sintered at atmospheric pressure under oxidation atmosphere. The resulting ITO target had a sintering density of 6.48 $g/cm^3$.

COMPARATIVE EXAMPLE 5

A predetermined amount of $In(NO_3)_3$ was dissolved in 5 L of distilled water to obtain an indium solution having an indium ion concentration of 5.5 M. A precipitate was obtained by adding 28 wt % $NH_4OH$ as a precipitant to the solution at a rate of 2 L/min at room temperature to obtain a precipitate. The pH of the solution was adjusted to 8. The viscosity of the slurry was high due to the high-concentration reaction solution. The resulting precipitate was stirred, aged for 9-12 hours, separated using a centrifuge, and washed. The washed precipitate was dried at 100° C. in an oven, and the dried powder was ground by ball milling. The ground powder was calcined in an electric furnace at 800° C. for 2 hours. The resulting $In_2O_3$ powder had a surface area of 4.5 $m^2/g$ when measured by the BET method.

The $In_2O_3$ powder prepared as described above and $SnO_2$ powder having a surface area of 10 $m^2/g$ when measured by the BET method were mixed in a weight ratio of 90:10. The powder mixture was molded into a predetermined shape using a mold and sintered at atmospheric pressure under oxidation atmosphere. The resulting ITO target had a sintering density of 6.18 $g/cm^3$.

COMPARATIVE EXAMPLE 6

A predetermined amount of $In(NO_3)_3$ was dissolved in 5 L of distilled water to obtain an indium solution having an indium ion concentration of 2.5 M. A precipitate was obtained by adding 28 wt % $NH_4OH$ as a precipitant to the solution at a rate of 2 L/min at room temperature to obtain a precipitate. The pH of the solution was adjusted to 8. The resulting precipitate was stirred, aged for 9-12 hours, separated using a centrifuge, and washed. The washed precipitate was dried at 100° C. in an oven, and the dried powder was ground by ball milling. The ground powder was calcined in an electric furnace at 1200° C. for 2 hours. Observation using a scanning electron microscope (SEM), after the calcination, indicated that the particles had grown significantly. The resulting $In_2O_3$ powder had a surface area of 4.3 $m^2/g$ when measured by the BET method.

The $In_2O_3$ powder prepared as described above and $SnO_2$ powder having a surface area of 10 $m^2/g$ when measured by the BET method were mixed in a weight ratio of 90:10. The powder mixture was molded into a predetermined shape using a mold and sintered. at atmospheric pressure under oxidation atmosphere. The resulting ITO target had a sintering density of 6.51 $g/cm^3$.

COMPARATIVE EXAMPLE 7

A predetermined amount of $In(NO_3)_3$ was dissolved in 5 L of distilled water to obtain an indium solution having an indium ion concentration of 3.0 M. A precipitate was obtained by adding 28 wt % $NH_4OH$ as a precipitant to the solution at a rate of 2 L/min at room temperature to obtain a precipitate. The pH of the solution was adjusted to 10. The resulting precipitate was stirred, aged for 9-12 hours, separated using a centrifuge, and washed. There was a strong ammonia smell during the wash. The washed precipitate was dried at 100° C. in an oven, and the dried powder was ground by ball milling. The ground powder was calcined in an electric furnace at 800° C. for 2 hours. Observation using a scanning electron microscope (SEM), after the calcination, indicated that the particles had grown significantly. The resulting $In_2O_3$ powder had a surface area of 31 $m^2/g$ when measured by the BET method.

The $In_2O_3$ powder prepared as described above and $SnO_2$ powder having a surface area of 10 $m^2/g$ when measured by the BET method were mixed in a weight ratio of 90:10. The powder mixture was molded into a predetermined shape using a mold and sintered at atmospheric pressure under oxidation atmosphere. The resulting ITO target had a sintering density of 6.67 $g/cm^3$.

The main $In_2O_3$ powder preparation conditions and the sintering density of each of the ITO targets in examples 1 through 6 and comparative examples 1 through 7 are shown in Table 1.

TABLE 1

| Example | Indium Concentration (M) | Rate of Precipitant Addition (L/min) | Reaction pH | Calcination Temperature (° C.) | Surface Area of $In_2O_3$ ($m^2/g$) | Particle Diameter of $In_2O_3$ (nm) | Surface Area of $SnO_2$ ($m^2/g$) | Particle Diameter of $SnO_2$ (nm) | Sintering Density of ITO target ($g/cm^3$) |
|---|---|---|---|---|---|---|---|---|---|
| Example 1 | 2.5 | 2 | 8 | 700 | 18 | 46 | 10 | 86 | 7.13 |
| Example 2 | 2.5 | 2 | 8 | 800 | 17 | 49 | 10 | 86 | 7.14 |
| Example 3 | 2.5 | 0.5 | 8 | 800 | 16 | 52 | 10 | 86 | 7.08 |
| Example 4 | 3.0 | 2 | 7 | 800 | 14 | 60 | 10 | 86 | 7.10 |
| Example 5 | 2.5 | 2 | 7 | 850 | 11 | 76 | 10 | 86 | 7.13 |
| Example 6 | 2.5 | 1 | 7 | 850 | 12 | 70 | 10 | 86 | 7.12 |
| Comparative Example 1 | 1.0 | 2 | 8 | 700 | 25 | 34 | 10 | 86 | 6.91 |
| Comparative Example 2 | 2.5 | 0.05 | 8 | 700 | 30 | 28 | 10 | 86 | 6.30 |
| Comparative Example 3 | 2.5 | 2 | 4 | 700 | 23 | 36 | 10 | 86 | 6.60 |
| Comparative Example 4 | 2.5 | 2 | 8 | 500 | 32 | 26 | 10 | 86 | 6.48 |
| Comparative Example 5 | 5.5 | 2 | 8 | 800 | 4.5 | 187 | 10 | 86 | 6.18 |

TABLE 1-continued

| Example | Indium Concentration (M) | Rate of Precipitant Addition (L/min) | Reaction pH | Calcination Temperature (° C.) | Surface Area of $In_2O_3$ ($m^2/g$) | Particle Diameter of $In_2O_3$ (nm) | Surface Area of $SnO_2$ ($m^2/g$) | Particle Diameter of $SnO_2$ (nm) | Sintering Density of ITO target ($g/cm^3$) |
|---|---|---|---|---|---|---|---|---|---|
| Comparative Example 6 | 2.5 | 2 | 8 | 1,200 | 4.3 | 195 | 10 | 86 | 6.51 |
| Comparative Example 7 | 3.0 | 2 | 10 | 800 | 31 | 27 | 10 | 86 | 6.67 |

According to the present invention, $In_2O_3$ powder may be prepared as in examples 1 through 6 by adjusting the concentration of the indium solution as well as the rate of adding the precipitant, the pH of the indium solution, and the calcination temperature and sintering the mixture. As is apparent from Table 1, by mixing $SnO_2$ powder with the $In_2O_3$ powder prepared according to the present invention, a high-density ITO target of above about 7.0 $g/cm^3$ may be manufactured. Especially, in the case of examples 1, 2, 5, and 6, a very high sintering density, approximate to a theoretical density of 7.15 $g/cm^3$, may be obtained for the ITO targets.

According to a preparation method of the present invention, it is possible to conveniently manufacture $In_2O_3$ powder having a uniform primary average particle diameter of 40-80 nm, which may be further ground into secondary particles of a size (D50 or D90) less than 1 μm. Through sintering after mixing $SnO_2$ powder of a uniform average particle diameter with the $In_2O_3$ powder prepared by the method according to the present invention, a high-density ITO target may be manufactured. The high-density ITO target according to the present invention is applicable for a high-quality, transparent electrode film for an LCD, EL, FED, etc. by sputtering in a vacuum.

Synthesis of $In_2O_3$ Powder

A method for synthesizing $In_2O_3$ powder to be mixed with $SnO_2$ powder and sintered to form ITO targets in the following examples 7 through 9 and comparative examples 8 and 9 is described herein. A predetermined amount of $In(NO_3)_3$, equivalent to a final indium ion concentration of 2.5 M, was dissolved in 5 L of distilled water. A precipitate was obtained by adding 28 wt % $NH_4OH$ as a precipitant to the solution at a rate of 2 L/min at room temperature. For this precipitation reaction, the pH of the solution was adjusted to 8. The resulting precipitate was aged for 9-12 hours, separated using a centrifuge, and washed. The washed precipitate was dried at 100° C. in an oven, and the dried powder was ground. The ground powder was calcined in an electric furnace at 700° C. for 2 hours. The resulting $In_2O_3$ powder had a surface area of 18 $m^2/g$ when measured by the BET method.

EXAMPLE 7

In Example 1, 300 g metallic tin was placed in a 5-L beaker. The metallic tin was dissolved by adding 2.5L 60 wt % nitric acid into the beaker, while stirring, at room temperature. The resulting mixture had a tin ion concentration of 1.0 M. The tin hydroxide precipitate was aged for 9-12 hours, separated using a centrifuge, and washed with distilled water. The precipitate was dried at 100° C. in an oven, ground, and calcined in an electric furnace at 600° C. for 2 hours to produce $SnO_2$ powder. The resulting $SnO_2$ powder had a surface area of 14 $m^2/g$ when measured by the BET method.

$In_2O_3$ powder having a surface area of 18 $m^2/g$ when measured by the BET method and the $SnO_2$ powder prepared as described above were mixed in a weight ratio of 90:10. The powder mixture was molded using a rectangular parallelepiped mold and sintered at 1,500° C. at atmospheric pressure under oxidation atmosphere. The resulting ITO target of a 20-cm width, 15-cm length, and 1-cm height had a sintering density of 7.13 $g/cm^3$.

EXAMPLE 8

A predetermined amount of $SnCl_4$, equivalent to a final tin ion concentration of 1.0 M, was dissolved in 5 L of distilled water. A precipitate was obtained by adding 28 wt % $NH_4OH$ as a precipitant to the solution at a rate of 1 L/min at room temperature. The pH of the solution was adjusted to 7. The resulting precipitate was aged for 9-12 hours, separated using a centrifuge, and washed. The washed precipitate was dried at 100° C. in an oven, and the dried powder was ground. The ground powder was calcined in an electric furnace at 700° C. for 2 hours. The resulting $SnO_2$ powder had a surface area of 12 $m^2/g$ when measured by the BET method.

$In_2O_3$ powder having a surface area of 18 $m^2/g$ when measured by the BET method and the $SnO_2$ powder prepared as described above were mixed in a weight ratio of 90:10. The powder mixture was molded using a rectangular parallelepiped mold and sintered at 1,500° C. at atmospheric pressure under oxidation atmosphere. The resulting ITO target of a 20-cm width, 15-cm length, and 1-cm height had a sintering density of 7.14 $g/cm^3$.

EXAMPLE 9

A predetermined amount of $SnCl_4$, equivalent to a final tin ion concentration of 1.5 M, was dissolved in 5 L of distilled water. A precipitate was obtained by adding 28 wt % $NH_4OH$ as a precipitant to the solution at a rate of 2 L/min at room temperature. The pH of the solution was adjusted to 7. The resulting precipitate was aged for 9-12 hours, separated using a centrifuge, and washed. The washed precipitate was dried at 100° C. in an oven, and the dried powder was ground using a hammer mill. The ground powder-was calcined in an electric furnace at 600° C. for 2 hours. The resulting $SnO_2$ powder had a surface area of 13 $m^2/g$ when measured by the BET method.

$In_2O_3$ powder having a surface area of 18 $m^2/g$ when measured by the BET method and the $SnO_2$ powder prepared as described above were mixed in a weight ratio of 90:10. The powder mixture was molded using a rectangular parallelepiped mold and sintered at 1,550° C. at atmospheric pressure under oxidation atmosphere. The resulting ITO target of a 20-cm width, 15-cm length, and 1-cm height had a sintering density of 7.12 $g/cm^3$.

COMPARATIVE EXAMPLE 8

A predetermined amount of $SnCl_4$, equivalent to a final tin ion concentration of 0.3 M, was dissolved in 5 L of distilled water. A precipitate was obtained by adding 28 wt % NH$_4$OH as a precipitant to the solution at a rate of 1 L/min at room temperature. The pH of the solution was adjusted to 7. The resulting precipitate was aged for 9-12 hours, separated using a centrifuge, and washed. The washed precipitate was dried at 100° C. in an oven, and the dried powder was ground using a hammer mill. The ground powder was calcined in an electric furnace at 600° C. for 2 hours. The resulting SnO$_2$ powder had a surface area of 16 m$^2$/g when measured by the BET method.

In$_2$O$_3$ powder having a surface area of 18 m$^2$/g when measured by the BET method and the SnO$_2$ powder prepared as described above were mixed in a weight ratio of 90:10. The powder mixture was molded using a rectangular parallelepiped mold and sintered at 1,550° C. at atmospheric pressure under oxidation atmosphere. The resulting ITO target of a 20-cm width, 15-cm length, and 1-cm height had a sintering density of 6.58 g/cm$^3$.

COMPARATIVE EXAMPLE 9

A predetermined amount of SnCl$_4$, equivalent to a final tin ion concentration of 3.0 M, was dissolved in 5 L of distilled water. A precipitate was obtained by adding 28 wt % NH$_4$OH as a precipitant to the solution at a rate of 1 L/min at room temperature. The pH of the solution was adjusted to 7. The resulting precipitate was aged for 9-12 hours, separated using a centrifuge, and washed. The washed precipitate was dried at 100° C. in an oven, and the dried powder was ground using a hammer mill. The ground powder was calcined in an electric furnace at 600° C. for 2 hours. The resulting SnO$_2$ powder had a surface area of 3 m$^2$/g when measured by the BET method.

In$_2$O$_3$ powder having a surface area of 18 m$^2$/g when measured by the BET method and the SnO$_2$ powder prepared as described above were mixed in a weight ratio of 90:10. The powder mixture was molded using a rectangular parallelepiped mold and sintered at 1,550° C. at atmospheric pressure under oxidation atmosphere. The resulting ITO target of a 20-cm width, 15-cm length, and 1-cm height had a sintering density of 6.35 g/cm$^3$.

The main SnO$_2$ powder preparation conditions and the sintering density of each of the ITO targets in examples 7 through 9 and comparative examples 8 and 9 are shown in Table 2.

According to the SnO$_2$ powder preparation method of the present invention, it is possible to conveniently manufacture SnO$_2$ powder having a uniform primary average particle diameter of 60-100 nm, which may then be further ground into secondary particles of a size (D50 or D90) less than 10 μm. Through sintering after mixing In$_2$O$_3$ powder of a uniform average particle diameter with the SnO$_2$ powder prepared by the method according to the present invention, a high-density ITO target may be manufactured. The high-density ITO target according to the present invention is applicable in forming a high-quality, transparent electrode film for a LCD, EL, FED, etc. by sputtering in a vacuum.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of preparing an ITO (indium tin oxide) target, comprising:
   preparing an In$_2$O$_3$ powder having a surface area of about 10-18 m$^2$/g and an average particle diameter of between about 40 to 80 nm;
   preparing a SnO$_2$ powder having a surface area of about 8-15 m$^2$/g and an average particle diameter of about 60-100 nm;
   molding a mixture of the In$_2$O$_3$ powder and the SnO$_2$ powder; and
   sintering the mixture at atmospheric pressure under oxidizing atmosphere.

2. The method as claimed in claim 1, wherein the mixture includes about 80-95% by weight of the In$_2$O$_3$ powder and about 5-20% by weight of the SnO$_2$ powder.

3. The method as claimed in claim 1, wherein the ITO target has a sintering density of greater than 7.0 g/cm$^3$.

4. The method as claimed in claim 1, wherein sintering the mixture is performed at a temperature of about 1,200° C. to about 1,600° C.

5. The method as claimed in claim 1, wherein preparing the In$_2$O$_3$ powder includes:

TABLE 2

| Example | Tin concentration (M) | Rate of Precipitant Addition (L/min) | Reaction pH | Calcination Temperature (° C.) | Surface Area of In$_2$O$_3$ (m$^2$/g) | Surface Area of SnO$_2$ (m$^2$/g) | Particle Diameter of SnO$_2$ (nm) | Sintering Density of ITO target (g/cm$^3$) |
|---|---|---|---|---|---|---|---|---|
| Example 7 | 1.0 | — | — | 600 | 18 | 14 | 62 | 7.13 |
| Example 8 | 1.0 | 1 | 7 | 700 | 18 | 12 | 72 | 7.14 |
| Example 9 | 1.5 | 2 | 7 | 600 | 18 | 13 | 66 | 7.12 |
| Comparative Example 8 | 0.3 | 1 | 7 | 600 | 18 | 16 | 54 | 6.58 |
| Comparative Example 9 | 3.0 | 1 | 7 | 600 | 18 | 3 | 287 | 6.35 |

According to the present invention, SnO$_2$ powder is prepared by adjusting the concentration of tin ions as well as the rate of adding the precipitant, the pH of the tin solution, and the calcination temperature, and sintering the mixture. As is apparent from Table 2, by mixing In$_2$O$_3$ powder with the SnO$_2$ powder prepared according to the present invention, a high-density ITO target of 7.12-7.14 g/cm$^3$, which approximates to a theoretical density of 7.15 g/cm$^3$, is obtained.

adding an alkaline precipitant to an indium solution having an indium ion concentration of about 2-5 M at room temperature, wherein the alkaline precipitant is added to the indium solution at a rate of about 0.5 L/min - about 4 L/min, while adjusting a pH of the indium solution to about 6-8 to form a In(OH)$_3$ precipitate; and calcining the In(OH)$_3$ precipitate at a temperature of between about 600° C. to about 1,100° C.

6. The method as claimed in claim 5, further comprising dissolving metallic indium in acid to form the indium solution.

7. The method as claimed in claim 5, further comprising dissolving an indium-containing salt in water to form the indium solution.

8. The method as claimed in claim 7, wherein the indium-containing salt includes $InCl_3$ and/or $In(NO_3)_3$.

9. The method as claimed in claim 5, wherein the alkaline precipitant includes $NH_4OH$, $NH_3$ gas, NaOH, KOH, $NH_4HCO_3$, $(NH_4)_2CO_3$ or a mixture including at least two of the foregoing materials.

10. The method as claimed in claim 9, wherein the $NH_4OH$ is 28 wt % $NH_4OH$.

11. The method as claimed in claim 5, further comprising washing and drying the precipitate before calcining.

12. The method as claimed in claim 1, wherein preparing the $SnO_2$ powder includes:
preparing a tin solution by dissolving metallic tin in an acid, the tin solution consisting essentially of tin ions, other ions produced from the dissociation of the acid, molecules of the acid, and water, wherein the tin ions are in a concentration of about 0.5-2 M;
allowing a tin hydroxide precipitate to precipitate from the tin solution at room temperature and aging the precipitate in the tin solution for about 1-24 hours;
separating the precipitate from the tin solution; and
calcining the separated precipitate at a temperature of about 400-900° C. to obtain the $SnO_2$ powder.

13. The method as claimed in claim 12, wherein the acid includes nitric acid and/or sulfuric acid.

14. The method as claimed in claim 12, wherein the structural formula of the precipitate is $Sn(OH)_2$ and/or $Sn(OH)_4$.

15. The method as claimed in claim 12, further comprising washing and drying the precipitate before the calcining.

16. The method as claimed in claim 1, wherein preparing the $SnO_2$ powder includes:
preparing a tin solution by dissolving a tin-containing salt in water, the tin solution consisting essentially of tin ions, other ions produced from the dissociation of the salt, and water, wherein the tin ions are in a concentration of about 0.5-2 M;
precipitating a precipitate of tin hydroxide by adding an alkaline precipitant to the tin solution at room temperature at a rate of about 0.5-3 L/min and adjusting the pH to about 3-7, and separating the precipitate from the tin solution; and
calcining the separated precipitate at a temperature of about 400-900° C. to obtain the $SnO_2$ powder.

17. The method as claimed in claim 16, wherein the tin-containing salt includes $SnF_4$, $SnCl_4$, $SnI_4$, $Sn(C_2H_3O_2)_2$, $SnCl_2$, $SnBr_2$, $SnI_2$, or a mixture including at least two of the foregoing materials.

18. The method as claimed in claim 16, wherein the alkaline precipitant includes $NH_4OH$, $NH_3$ gas, NaOH, KOH, $NH_4HCO_3$, $(NH_4)_2CO_3$, or a mixture including at least two of the foregoing materials.

19. The method as claimed in claim 18, wherein the $NH_4OH$ is 28 wt % $NH_4OH$.

20. The method as claimed in claim 16, further comprising washing and drying the separated precipitate before calcining the precipitate.

21. A method of preparing an ITO (indium tin oxide) target, comprising:
preparing an $In_2O_3$ powder having a surface area of about 5-18 $m^2/g$ and an average particle diameter of between about 40 to 160 nm;
preparing a $SnO_2$ powder having a surface area of about 4-15 $m^2/g$ and an average particle diameter of about 50-200 nm;
molding a mixture of the $In_2O_3$ powder and the $SnO_2$ powder; and
sintering the mixture at atmospheric pressure under oxidizing atmosphere.

* * * * *